United States Patent [19]
Brunner

[11] Patent Number: 5,555,922
[45] Date of Patent: Sep. 17, 1996

[54] TIRE BEAD BREAKING TOOL

[76] Inventor: Larry F. Brunner, P.O. Box 768, Springfield, Vt. 05156

[21] Appl. No.: 423,840

[22] Filed: Apr. 18, 1995

[51] Int. Cl.$^6$ .................................................. B60C 25/125
[52] U.S. Cl. ................................................................ 157/1.17
[58] Field of Search .................................... 157/1.1, 1.17, 157/1.3, 1.2, 1.21, 1.26, 1.28

[56]  References Cited

U.S. PATENT DOCUMENTS

| | | | |
|---|---|---|---|
| 2,455,580 | 12/1948 | Hewitt | 157/1.17 |
| 2,619,158 | 11/1952 | Kohn | 157/1.17 |
| 2,920,664 | 1/1960 | Lomen et al. | 157/1.28 X |
| 3,256,923 | 6/1966 | Furrer | 157/1.17 |
| 4,222,426 | 9/1980 | Brosene, Jr. | 157/1.28 |
| 4,226,275 | 10/1980 | Robins | 157/1.2 |
| 4,676,291 | 6/1987 | Bolger | 157/1.17 |
| 4,953,606 | 9/1990 | Brown | 157/1.17 |
| 4,969,498 | 11/1990 | Sheets | 157/1.17 |
| 5,191,934 | 3/1993 | Wicklund | 157/1.17 |

FOREIGN PATENT DOCUMENTS 2039654  2/1972  Germany ............................. 157/1.17

OTHER PUBLICATIONS

The "Cholla ATV Bead–Breaker", advertised in the Precision Mfg. & Sales Co. Professional Tools & Equipment catalog on p. 36, dated Aug., 1991.

*Primary Examiner*—D. S. Meislin
*Attorney, Agent, or Firm*—Michael J. Weins

[57] ABSTRACT

The present invention is for a bead breaking tool which can be used in combination with various tire stripping stands and benches to break a tire bead before a tire is stripped from its rim. The tool has sidewall engaging legs which depress the sidewall of the tire, opening pockets between the rim and the tire into which rim engaging jaws can be inserted. Providing the pockets reduces the likelihood of damage to the tire or rim during bead breaking. The tool is effective in removing rims which have a safety rib such as is employed for many of the rims which are intended for use with low pressure tires such as the tires for All Terrain Vehicles.

19 Claims, 6 Drawing Sheets

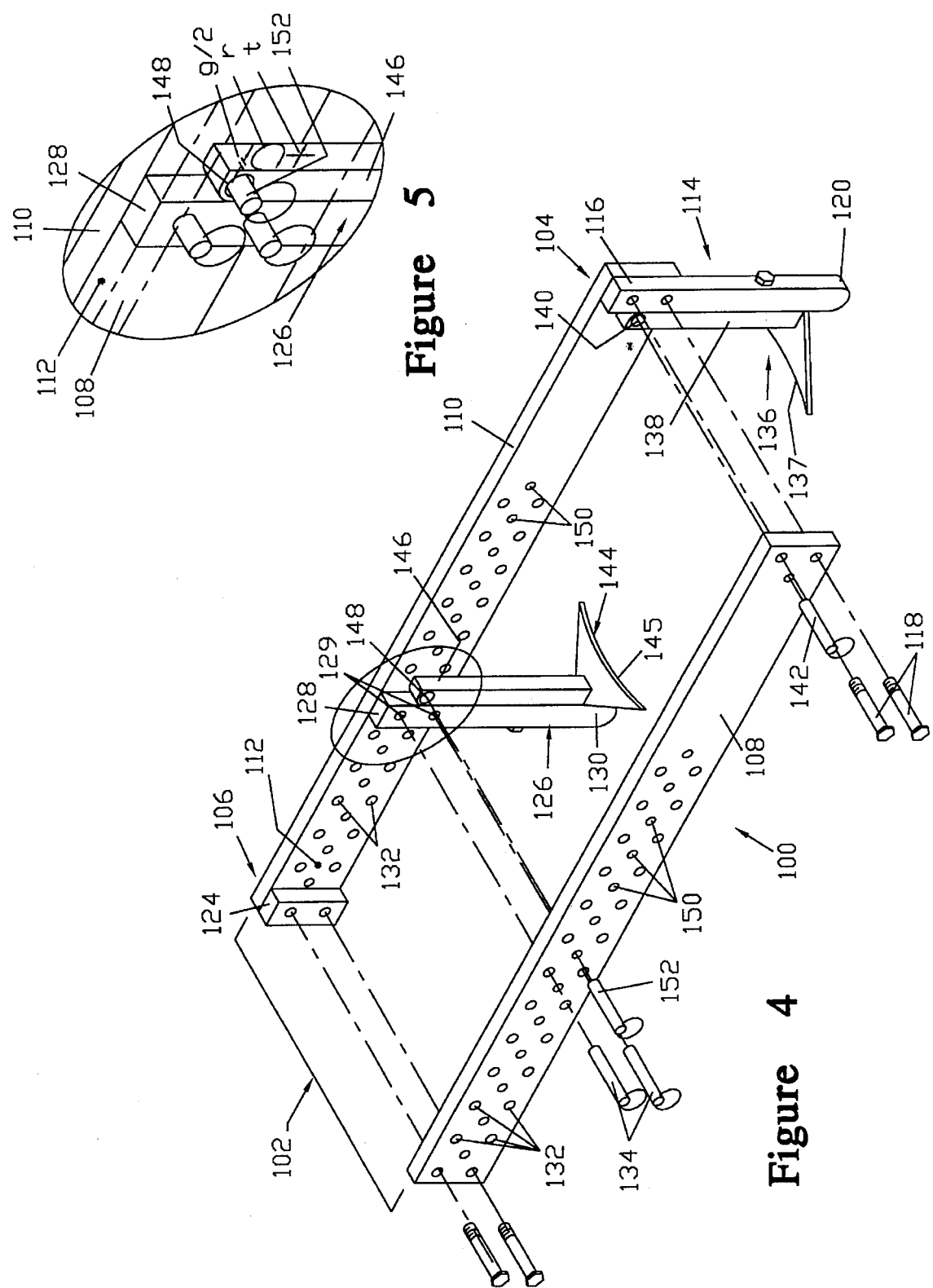

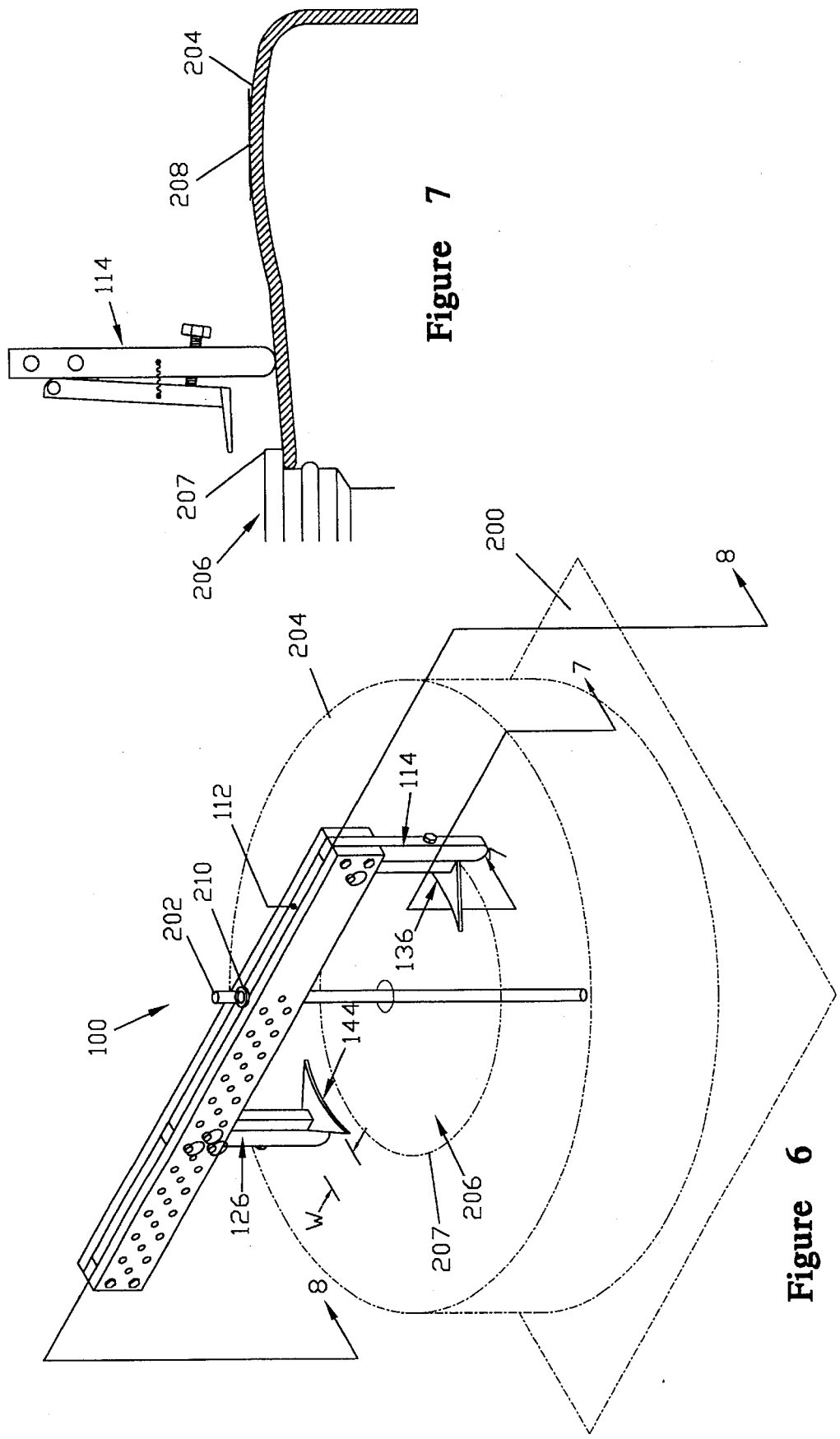

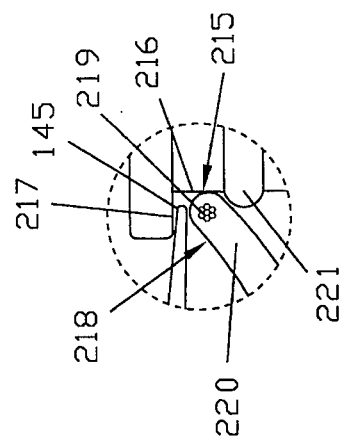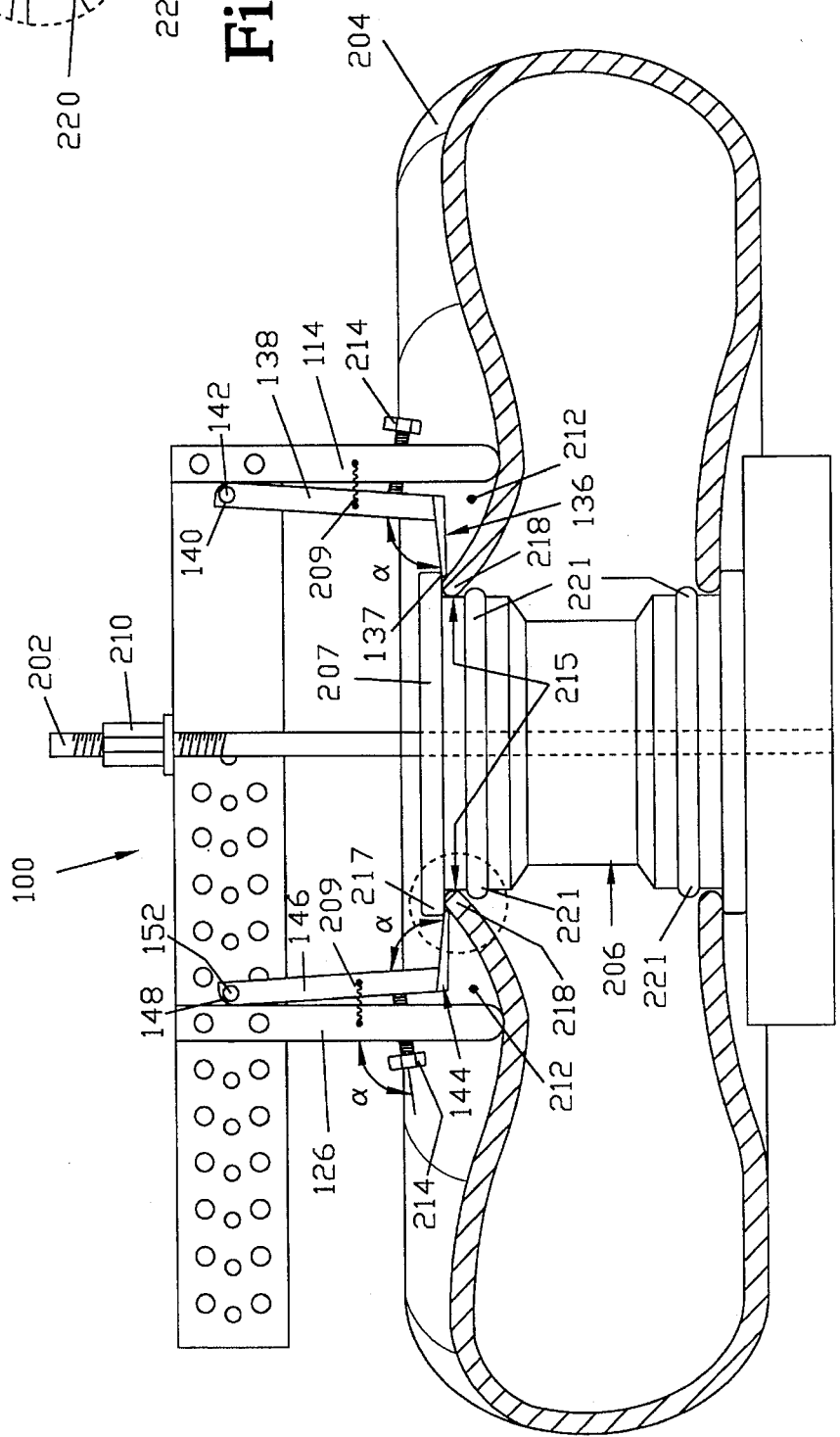
Figure 9
Figure 8

TIRE BEAD BREAKING TOOL

Field of the Invention

The present invention relates to a tool for disengaging a tire from a rim of a wheel.

BACKGROUND OF THE INVENTION

Maintaining an inflatable tire on a rim of a wheel while permitting the tire to be readily removed from the rim for repair or replacement has presented a variety of problems over the years. To maintain the tire on the wheel during use, it has been found that providing a bead bundle such as a braided loop of wire in the rim engaging portion of the tire enhances its rim gripping capacity helping to maintain the tire on the rim. The rim engaging portion of the tire with the bead bundle embedded in it is known in the art as the tire bead and generally, in an unstressed condition, the inner diameter of the tire bead is smaller than the diameter of the rim on which it will reside.

The lack of clearance between the tire and the rim has made the removal of tires from their rims difficult. A variety of hand tools such as slide bars, hammers, chisel-like tools, and jackscrews have been used to disengage the tire bead from the rim of a wheel. These techniques can require great strength and dexterity on the part of the operator. Furthermore, these hand tool techniques can cause damage to the tire and rim.

The process of disengaging the tire from the rim of a wheel is frequently referred to as "bead breaking". After the tire bead is broken, the tire is then stripped from the rim of the wheel. Many of today's tires and, in particular, the All Terrain Vehicle's (ATVs) tire designs have further complicated the task of bead breaking. These All Terrain Vehicles are designed to be driven off-road with rough, slippery and even soft muddy surfaces. To provide better traction, ATV tires are wide, soft, and balloon-like.

These tires operate at low pressure (frequently in the neighborhood of 3 psi.) and can have the tire bead broken when aggressively driven. This has led to the use of safety rims which have an annular safety rib set apart from the rim to provide additional support for the tire bead. The safety rib effectively prevents the tire beads from breaking away from the bead seat while in operation. However, the safety rib has made the bead breaking task more difficult. The balloon-like profile of the tires used on ATVs makes it difficult to insert a tool between the rim and the tire.

A variety of bead breaking devices have been developed to cope with the problems of bead breaking and, in particular, for bead breaking of ATV tires. One such device, for example, is the "Cholla ATV Bead-Breaker" which is shown in the "Precision Mfg. & Sales Co. Professional Tools & Equipment" catalog on page 36, dated August, 1991. However, this device attempts to insert two jaws between the rim and the tire without first moving the sidewall out of the way, thus having a potential for damaging either the rim or the sidewall.

Bead breaking devices have also been taught by U.S. Pat. Nos. 4,676,291 and 5,191,934; however, these patents have the same jaw insertion limitation as the "Cholla ATV Bead-Breaker".

U.S. Pat. No. 4,969,498 teaches a bead breaking machine designed to hold a tire and provides complex mechanism to depress the tire sidewall opening up a space to insert a bead breaker foot. However, the '498 device is a stand alone dedicated machine that relies on a jack to exert force.

Thus there is a need for a simple tool which can be used with a variety of tire stripping stands and benches to effectively break beads.

OBJECTS OF THE INVENTION

It is an object of the invention to provide a tire bead breaking tool which can be used with a variety of tire stripping stands or tables.

It is another object of the invention to provide a tire bead breaking tool for pliable or soft sidewall tires which is effective in breaking the tire bead from the rim of a wheel.

It is still another object of the invention to provide a tire bead breaking tool which is suitable for All Terrain Vehicle (ATV) tires.

It is a further object of the invention to provide a tool which can effectively break a tire bead from a rim where the sidewall of the tire is flush with the rim on which it is mounted.

Yet another object of the invention is to provide a tire bead breaking tool which will not damage the rim when breaking the tire bead from the rim of the wheel.

It is still another object of the invention to provide tire bead breaking tool which will not damage the tire when breaking the tire bead.

It is yet another object of the invention to provide a tire bead breaking tool which can effectively break a tire bead which is secured in a bead seat created by the rim flange and a safety rib.

These and other objects of the invention will become apparent from the following description, figures and claims.

SUMMARY OF THE INVENTION

The present invention is directed to a tool for disengaging a tire bead from the rim of a wheel which will be referred to as bead breaking. The tool of the present invention is well suited for use with various tire stripping stands and benches such as those taught in U.S. Pat. No. 5,332,020 and co-pending application Ser. No. 08/259,851 of the present inventor. The tool of the present invention has a header and a first sidewall engaging leg having a first leg proximal end which attaches to the header and a first leg distal end which extends beyond the header. A second sidewall engaging leg has a second leg proximal end and a second leg distal end. The second sidewall engaging leg is spaced apart by a separation S from the first sidewall engaging leg and its second leg proximal end attaches to the header while the second leg distal end extends beyond the header.

When the tool of the present invention is designed to accommodate tires of different sizes, means for adjusting the separation S between the first sidewall engaging leg and the second sidewall engaging leg are provided. When the means for adjusting the separation S employs means for clamping the legs to the header, then for a header which has a first outer wall and a second outer wall which are spaced apart providing a header passage therebetween, adjustability can be provided by having the first sidewall engaging leg slidably engaged in the header passage and providing a first leg clamp to affix the first sidewall engaging leg therein. Similarly, the second sidewall engaging leg can be designed to slidably engage the header passage and a second leg clamp provided to affix the second sidewall engaging leg. Adjustability of the separation S can also be maintained if one of the sidewall engaging legs is permanently attached to the header.

Alternatively, the means for adjusting the separation S can be leg pins which pass through the header and the sidewall engaging legs. The outer walls of the header are provided with multiple sets of leg positioning holes. Each of these sets of leg positioning holes provide an attachment site for the sidewall engaging legs allowing the separation S to be step-wise adjusted.

A first rim engaging jaw and a second rim engaging jaw are positioned between the first sidewall engaging leg and the second sidewall engaging leg at a lesser distance from the header than the first leg distal end and the second leg distal end. It is preferred that the first leg distal end and the second leg distal end extend beyond the first rim engaging jaw by at least ½ inches and less than about 2¼ inches.

The first rim engaging jaw has a first jaw stem which is pivotably connected to the first sidewall engaging leg. This connection may be directly to the first sidewall engaging leg or to the header which in turn is connected to the first sidewall engaging leg. Similarly, the second rim engaging jaw has a second jaw stem which is pivotably connected to the second sidewall engaging leg. Again, this connection to the second sidewall engaging leg can be either direct or through the header. Preferably, the first rim engaging jaw is in close proximity to the first sidewall engaging leg and the second rim engaging jaw is in close proximity to the second sidewall engaging leg.

In order to accommodate wheels having different diameters it is preferred that means for adjusting the separation D between the first rim engaging jaw and the second rim engaging jaw be provided. The means for adjusting the separation S between the first sidewall engaging leg and the second sidewall engaging leg serve as the means for adjusting the separation D between the first rim engaging jaw and the second rim engaging jaw when the jaws are directly connected to the sidewall engaging legs. When the rim engaging jaws are indirectly connected to the sidewall engaging legs via the header to which they are pivotably mounted, means for clamping the jaws similar to the means for clamping the legs can be used to provide adjustability to the spacing of the rim engaging jaws or, alternatively, a series of jaw positioning holes can be provided in the header through which pivot pins pass. These pivot pins in turn extend through passages in the jaw stems allowing the rim engaging jaws to pivot with respect to the sidewall engaging legs.

Means are provided to advance the first rim engaging jaw toward the second rim engaging jaw to form a closed position where the first rim engaging jaw and the second rim engaging jaw are in contact with the rim of the wheel. It is further preferred that the included angle between the jaws and the stems be between about 100° and 105°.

For wheel rims having a bead seat bounded by a safety rib which is positioned to help retain the bead in the bead seat, it is preferred that the tire bead breaking tool be provided with means for providing radial separation of the jaws from their closed position as the jaws are advanced toward the safety rib. Such mobility can be obtained by the undersized pivot pins which pass through passages in the stems on which the jaws mount. The undersized pivot pins allow radial motion of the jaws as they are advanced into the safety rib.

It is further preferred that means for biasing the jaws toward the sidewall engaging legs be provided to stabilize the jaws when the tool is being positioned.

BRIEF DESCRIPTION OF THE FIGURES

FIG. 4 is a partially exploded isometric view of an embodiment similar to the bead breaking tool of the embodiment of FIGS. 1 through 3. This embodiment differs from the embodiment of FIGS. 1 through 3 in that the pivot pins employed to pivotably connect the stems to the header traverse passages in the jaw stems which are oversized with respect to the pivot pins providing a translational movement between the sidewall engaging legs and the rim engaging jaws.

FIG. 5 is an enlargement of the circled region of FIG. 4 and illustrates details of the relationship between the pivot pin and the passage in the jaw stem through which the pivot pin passes.

FIG. 6 illustrates the use of the tire bead breaking tool of the present invention being employed with a tire stripping bench having a central hold-down rod.

FIG. 7 is a section 7—7 of FIG. 6 which illustrates the relationship of the wheel rim, the sidewall engaging leg and the crown point of the tire sidewall.

FIG. 8 is a section 8—8 of FIG. 6 illustrating the tool of FIG. 6 where the sidewall engaging legs are in contact with the tire and have depressed portions of the sidewall of the tire to provide rim exposing pockets. The rim engaging jaws are shown in the pockets and in contact with the rim of the wheel. The wheel illustrated in FIG. 8 has a safety rib to increase the stability the tire on the rim.

FIG. 9 is an enlargement of the circled section of FIG. 8 and shows details of a tire bead and its bead seat in the rim of the wheel.

BEST MODE FOR CARRYING THE INVENTION INTO PRACTICE

Figure 3:
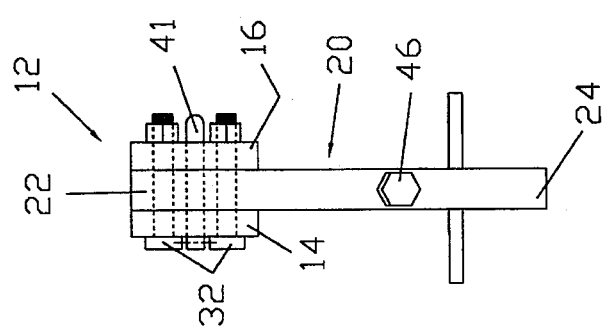
FIGS. 1 through 3 are respectively an elevation view, a bottom view, and an end view of one embodiment of the bead breaking tool of the present invention. In this embodiment of the invention, a first sidewall engaging leg is employed which is fixed with respect to a header. A second sidewall engaging leg is provided which slidably engages the header. Leg pins are employed which pass through the header and the second sidewall engaging leg fixing it with respect to the header. A pair of rim engaging jaws are positioned between the first and second sidewall engaging legs and are pivotably connected to the header.
Figure 2:
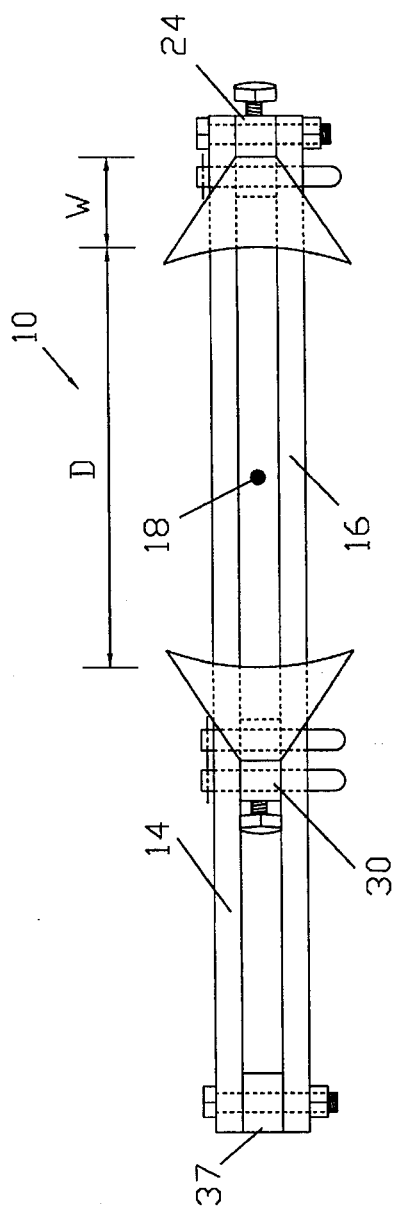
Figure 1:
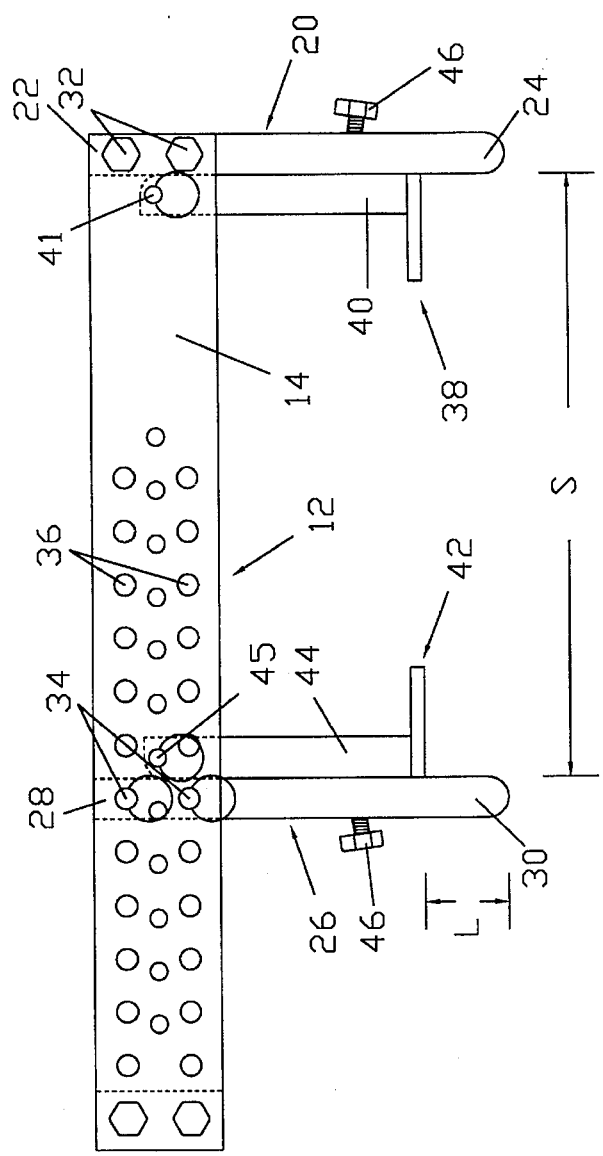

FIGS. 1 through 3 illustrate one embodiment of a tire bead breaking tool 10. The tire bead breaking tool 10 has a header 12 with a first outer wall 14 and a second outer wall 16 which are spaced apart providing a header passage 18 therebetween.

A first sidewall engaging leg 20 has a first leg proximal end 22 which engages the header 12 and a first leg distal end 24 which extends beyond the header 12. A second sidewall engaging leg 26 has a second leg proximal end 28 which engages the header 12 and a second leg distal end 30 which extends beyond the header 12. For the embodiment of FIGS. 1 through 3, the first sidewall engaging leg 20 is engaged in the header passage 18 with bolts 32. The second sidewall engaging leg 26 slidably engages the header passage 18 and can be secured at selected positions in the header passage 18 by a pair of leg pins 34 which pass through pairs of leg positioning holes 36 in the first outer wall 14 and the second outer wall 16 of the header 12. While in the embodiment of FIGS. 1 through 3, the first sidewall engaging leg 20 is affixed with bolts 32, it should be appreciated that the first sidewall engaging leg 20 could be welded or braised in position or alternatively could also be mounted to the header 12 with pins.

A spacer block 37, preferably having the same width as the first sidewall engaging leg 20 and the second sidewall engaging leg 26, is employed to terminate the header passage 18.

A first rim engaging jaw 38 having a first jaw stem 40 is pivotably connected to the header 12 and is mounted in the header passage 18. For this embodiment, the pivotable connection between the first jaw stem 40 and the first sidewall engaging leg 20 is indirect, being through the header 12. The first jaw stem 40 is mounted in the header passage 18 with a first pivot pin 41. A second rim engaging jaw 42 having a second jaw stem 44 is pivotably connected to the header 12. The second jaw stem 44 resides in the header passage 18 where it is mounted with a second pivot pin 45. The first rim engaging jaw 38 and the second rim engaging jaw 42 are mounted in a spaced apart relationship having a jaw separation D. The rim engaging jaws (38, 42) reside between the first sidewall engaging leg 20 and the second sidewall engaging leg 26 which are spaced apart to provide a leg separation S which is greater than D.

The distal ends (24, 30) of the sidewall engaging legs (20, 26) are preferably smooth surfaces and extend beyond the rim engaging jaws (38, 42) by a distance L. The distance L is preferably between about ½ and 2¼ inches. The lower limit assures that the sidewall engaging legs (20, 26) deform the sidewall of the tire prior to engaging the rim engaging jaws (38, 42) with the rim of a wheel. The upper limit, in turn, assures that the tool 10 can still be advanced to force the tire bead away from the bead seat without the sidewall engaging legs (20, 26) either ripping the tire due to its deformation or impinging on any substructure on which the wheel and tire are mounted.

The relative motion between the rim engaging jaws (38, 42) is provided by jaw advancing bolts 46, which pass through the sidewall engaging legs (20, 26) and abut the jaw stems (40, 44). These jaw advancing bolts 46 serve as means for rotating the first rim engaging jaw 38 and the second rim engaging jaw 42 toward each other and into a closed position where they will contact the tire rim.

FIG. 4 illustrates a partially exploded isometric drawing similar to the embodiment of FIGS. 1 through 3. The embodiment of FIG. 4 differs from the embodiment of FIGS. 1 through 3 primarily in the mountings used for the rim engaging jaws. The embodiment of FIG. 4 has particular utility for use on rims where the bead seat is fitted with a safety rib. Many of the ATV wheels and other wheels designed for low pressure tires employ a safety rib. For such wheels there is a need to provide radial movement of the rim engaging jaws as they are advanced toward the safety rib.

The tire bead breaking tool 100 of the embodiment illustrated in FIG. 4 has a header 102 which has a first header end 104 and a second header end 106. The header 102 has a first outer wall 108 and a second outer wall 110. The outer walls (108, 110) are spaced apart providing a header passage 112 therebetween. The header passage 112 is terminated at the first header end 104 by a first sidewall engaging leg 114. The first sidewall engaging leg 114 has a first leg proximal end 116 which is attached to the first outer wall 108 and the second outer wall 110 by bolts 118. The first sidewall engaging leg 114 terminates in a first leg distal end 120 which extends beyond the header 102. The second header end 106 is terminated by a spacer block 124.

A second sidewall engaging leg 126 is provided which has a second leg proximal end 128 which engages the header 102 and a second leg distal end 130 which extends there beyond. The second leg proximal end 128 has leg holes 129 and slidably engages the header passage 112. The second sidewall engaging leg 126 can be fixably positioned therein at selected separations from the first sidewall engaging leg 114 by aligning the leg holes 129 with paired leg positioning holes 132 in the outer walls (108, 110). Leg pins 134 are used to fix the position of the second sidewall engaging leg 126.

A first rim engaging jaw 136 having a first leading edge 137 which is designed to engage a wheel rim is provided. The first rim engaging jaw 136 has a first jaw stem 138. The first jaw stem 138 has a first jaw stem passage 140 therethrough. The first jaw stem 138 is positioned such that a portion thereof lies in the header passage 112. A first pivot pin 142 is provided which passes through the first jaw stem passage 140 and is undersized with respect thereto, thereby providing, in addition to rotational movement, limited translational movement of the first rim engaging jaw 136.

A second rim engaging jaw 144 having a second leading edge 145 which is contoured to engage a wheel rim is provided. The second rim engaging jaw 144 has a second jaw stem 146 which, in turn, has a second jaw stem passage 148 therethrough. The second jaw stem 146 is positioned such that a portion of the second jaw stem 146 resides in the header passage 112.

A series of jaw stem positioning holes 150 are provided and are positioned with respect to the paired leg positioning holes 132 such that when a second pivot pin 152 is passed through the second jaw stem passage 148, it will be in close proximity with respect to the second sidewall engaging leg 126. Again, the second pivot pin 152 is undersized with respect to the second jaw stem passage 148 providing both rotational motion r as well as limited translational motion t as is illustrated in FIG. 5 which is the circled section of FIG. 4, with the first outer wall 108 shown in phantom. FIG. 5 illustrates the interrelationship between the series of jaw stem positioning holes 150, the second pivot pin 152, and the second jaw stem passage 148. A gap g of between about ⅛ and ¼ inches between the diameter of the jaw stem passages (140, 148) and the diameter of the pivot pins (142, 152) is preferred when the nominal length of the jaw stems (138, 146) is about 5 inches.

FIGS. 6 through 11 are provided to illustrate how the tool of the present invention can be used in combination with tire stripping stands and benches. FIG. 6 illustrates the tire bead breaking tool 100 used in combination with a bench 200 having a tire hold-down rod 202. Further discussion of this type bench is found in the '020 patent. The tire bead breaking tool 100 is shown being used in combination with the bench 200 to break a tire bead (not shown) of a tire 204 from a wheel 206 having a rim 207 which engages the tire 204. The wheel 206 is placed on the bench 200 with the tire hold-down rod 202 passing through an open hub in the wheel 206. The tire bead breaking tool 100 is positioned with the tire hold-down rod 202 passing through the header passage 112 and with the first sidewall engaging leg 114 and the second sidewall engaging leg 126 in contact with the tire 204. The adjustability of the tool allows the rim engaging jaw separation D (best shown in FIG. 2) to be altered so that the rim engaging jaws (136, 144) will pass over the rim 207 of the wheel 206. It is preferred that a distance W, the minimum distance between the sidewall engaging legs (114, 126) and the leading edges (137, 145) of the rim engaging jaws (136, 144), (best shown in FIG. 2) be maintained less than the distance between the rim 207 and a crown point 208 of the tire, the crown point 208 being defined as the most outward point on the profile of the tire 204 as is illustrated in FIG. 7. Having the sidewall engaging legs (114, 126) so positioned assures that the major portion of the sidewall deformation will be in the region of the sidewall that is bounded between the rim 207 and the crown point 208.

FIG. 8 is a section 8—8 of a modified embodiment of FIG. 6. The modification of this embodiment includes retaining springs 209 which bias the rim engaging jaws (136, 144) toward the sidewall engaging legs (114, 126). Also in this embodiment there is an included angle α of between 100° and 105° provided between the jaws (136, 144) and the jaw stems (138, 146). This angle provides for an upward movement of the jaws as they are brought into contact with the rim. This embodiment shows the tire bead breaking tool 100 after it has been moved down along the tire hold-down rod 202 by tightening a nut 210 to bring the sidewall engaging legs (114, 126) in contact with and depress the sidewall of the tire 204 creating rim exposing pockets 212. When the rim exposing pockets 212 have been formed and the leading edges (137, 145) of the rim engaging jaws (136, 144) have been lowered below the rim 207, the rim engaging jaws (136, 144) are advanced toward each other as they pivot about the pivot pins (142, 152). The rim engaging jaws (136, 144) are advanced by tightening jaw advancing bolts 214. The jaw advancing bolts 214 are tightened until the leading edges (137, 145) of the rim engaging jaws (136, 144) engage the rim 207 of the wheel 206. It is also preferred that the angle included between the jaw advancing bolt and the sidewall engaging leg be maintained at about an angle α defined above to provide a substantially normal contact between the jaw advancing bolts 214 and the jaw stems (138, 146) when the rim engaging jaws (136, 144) engage the rim.

To maintain the tire 204 on the rim 207 when the tire 204 is inflated and in service, the rim 207 is provided with a bead seat 215 which is a circular channel having a radial surface 216 for opposing radial loads of the tire 204 and a sealing surface 217 for opposing the axial loads of the sidewall on the rim 207; these surfaces support a tire bead 218 of the tire 204. Details of the tire bead 218 are illustrated in FIG. 9 which is an enlarged view of the circled section of FIG. 8. The tire bead 218 has a core or bead bundle 219 which is a braided cable and is encapsulated in rubber which forms the tire sidewall 220. The diameter of the unstressed tire bead 218 is smaller than the diameter of the rim 207 so that when the tire 204 is inflated, the bead bundle 219 will assist in maintaining the tire bead 218 in the bead seat 215. The air in conventional stiff wall tires will maintain the tire bead 218 sealed if the tire is subject to axial loads. In such cases, the pressure will be sufficient to assure the tire bead remains sealed against the sealing surface when axial loads are applied. However, for soft wall tires where the pressure is low when the vehicle is being maneuvered, the pressure in the tire 204 may not be sufficient to maintain a seal between the sealing surface 217 and the tire bead 218. For tires 204 with soft sidewalls, it is preferred that the bead seat 215 be fitted with a safety rib 221 that helps to maintain the tire bead 218 in the bead seat 215. The safety rib 221 is employed for wheels intended for use with low pressure tires such as for tires for use with ATVs.

For the wheel illustrated in FIG. 8 which has a safety rib 221, as the rim engaging jaws (136, 144) are advanced, the tire bead 218 will advance and make contact with the safety rib 221. This contact will stop the rim engaging jaws (136, 144) unless they move radially outward from the rim 207 of the wheel 206 to increase the separation between the rim engaging jaws (136, 144). In this embodiment, the radial motion is provided by employing the pivot pins (142, 152) which are undersized with respect to the jaw stem passages (140, 148) better illustrated in FIG. 5. By undersizing the pivot pins, the pin and passage combination provides translational motion t as well rotational motion r.

Figure 10:
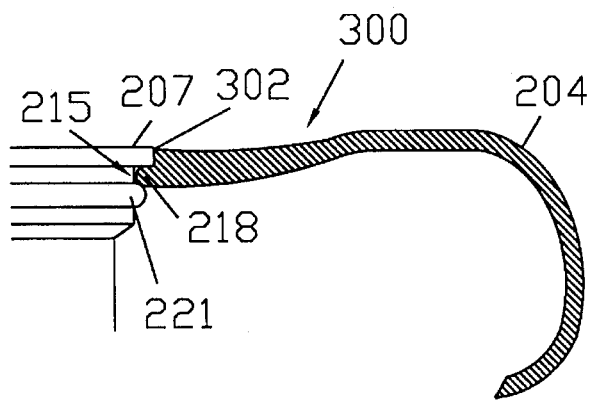
FIG. 10 is a section of a tire and rim combination illustrating a tire configuration where the tire profile is flush with the rim of the tire.

FIG. 10 illustrates a soft sidewall tire which has been designed for use with a rim having a safety rib. The tire has a tire profile 300 which is flush with the rim 207 at a rim/tire interface 302 which makes the tire bead 218 particularly difficult to break since no portion of the tire bead seat 215 is exposed. Thus a tool cannot be wedged between the rim 207 and the tire 204. The sidewall engaging legs (114, 126) are not only helpful in initiating the tire bead breaking process but also are essential to the breaking of the tire bead 218 without damage to either the rim 207 or the tire 204.

Figure 11:
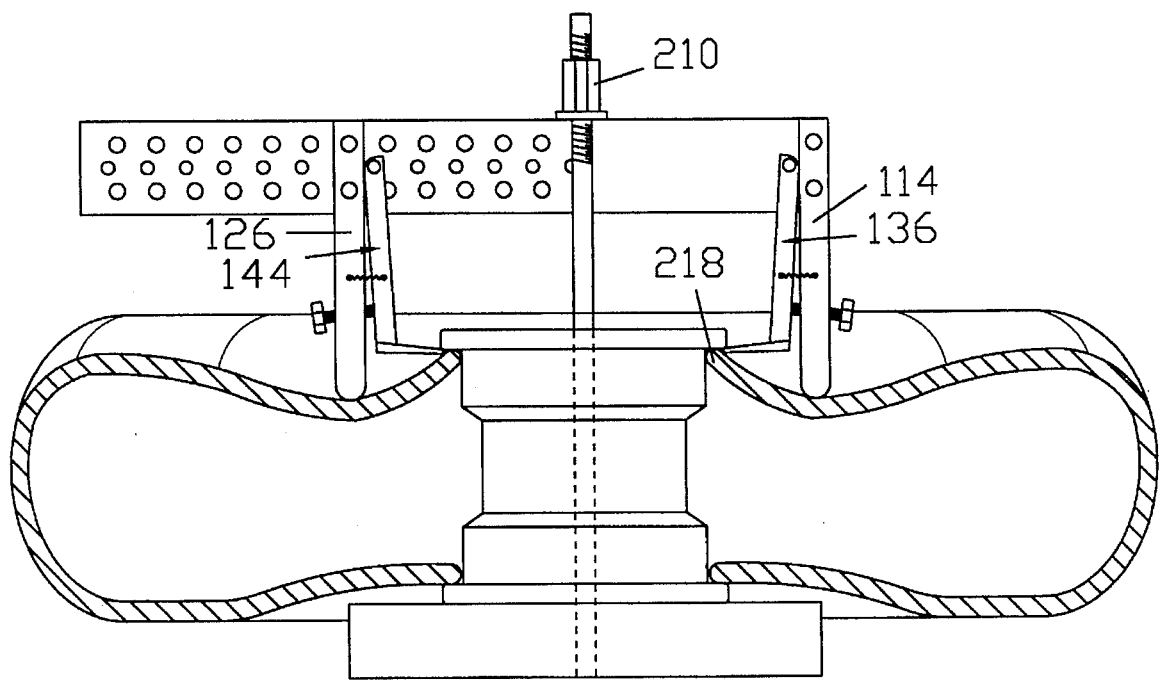
FIG. 11 is another embodiment of a tire bead breaking tool similar to the tire bead breaking tool of FIG. 8; however, the pivotal motion between the rim engaging jaw and the sidewall engaging legs does not have the translational component of FIG. 9.

FIG. 11 illustrates a wheel mounted without the safety rib of the wheel of FIG. 8. When a wheel with the configuration of FIG. 11 is being changed, there is no need for having the pivot pins smaller than the jaw stem passages (140, 148 of FIG. 4) since there is no need to provide a radial motion of the rim engaging jaws (136, 144 of FIG. 4).

Figures 12, 13:
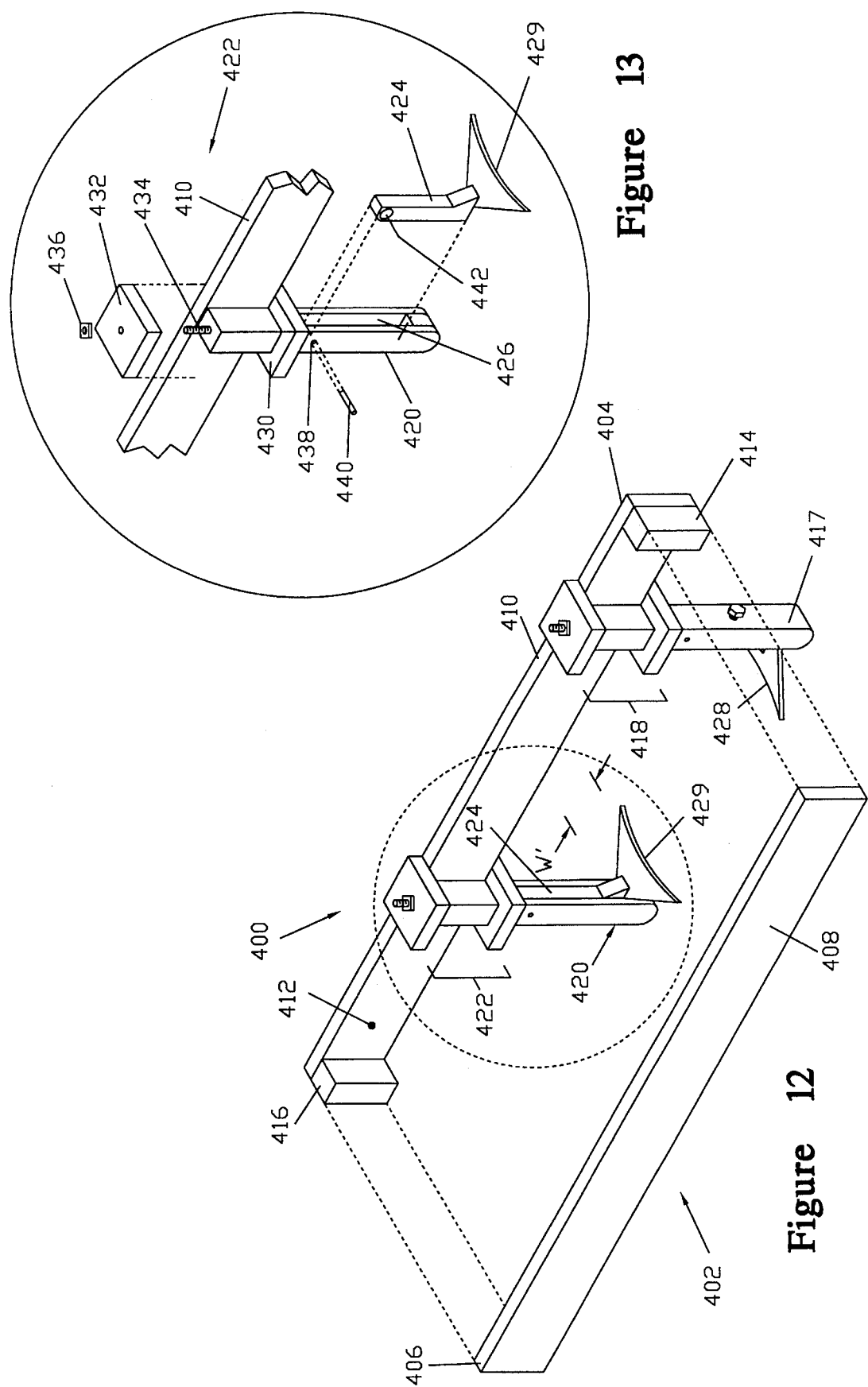
FIG. 12 is another embodiment of the bead breaking tool of the present invention. In this embodiment, rim engaging jaws have jaw stems which are directly pivotably mounted to sidewall engaging legs. In this embodiment, the sidewall engaging legs are clamped to the header to provide continuous adjustability in the separation between the sidewall engaging legs.
FIG. 13 is an exploded view of one of the sidewall engaging legs and its associated rim engaging jaw and clamping mechanism.

FIG. 12 is a partially exploded isometric drawing of another embodiment of a bead breaking tool 400 of the present invention. The bead breaking tool 400 has a header 402 terminating in a first header end 404 and a second header end 406. The header 402 has a first outer wall 408 and a second outer wall 410 which is spaced apart from the first outer wall 408 providing a header passage 412 therebetween. A first end block 414 at the first header end 404 and a second end block 416 at the second header end 406 terminate the header passage 412. A first sidewall engaging leg 417 slidably engages the header passage 412 and is fixed with respect to the header 402 by a first leg clamp 418.

Similarly, a second sidewall engaging leg 420 slidably engages the header passage 412 and is fixed with respect to the header 402 by a second leg clamp 422. The leg clamps (418, 422) and the header passage 412, in combination, provide a means for continuous adjustment of the separation between the first sidewall engaging leg 417 and the second sidewall engaging leg 420. This embodiment also differs from earlier described embodiments since a first jaw stem (not shown) is pivotably mounted to the first sidewall engaging leg 417 rather than maintaining a pivotable connection via the header 402. Similarly, a second jaw stem 424 is pivotably mounted directly to the second sidewall engaging leg 420.

FIG. 13 is an exploded view of the second leg clamp 422 and its associated second jaw stem 424 and second sidewall engaging leg 420. In the embodiment of FIG. 12, the separation W' has been reduced by providing a channel 426 (better shown in FIG. 13) in the second sidewall engaging leg 420 in which the second jaw stem 424 resides. Similarly, the first sidewall engaging leg 417 has a channel (not shown) which houses the first jaw stem (not shown). This configuration is preferred to maximize the separation between the first rim engaging jaw 428 and the second rim engaging jaw 429.

FIG. 13 also illustrates details of the second leg clamp 422 of FIG. 12. A lower clamp plate 430 is attached to the second sidewall engaging leg 420 and positioned below the header 402. The upper clamp plate 432 is positioned above the header 402. A tie down bolt 434 which is attached to or is an integral part of the second sidewall engaging leg 420 passes through the upper clamp plate 432. A tie-down nut 436 secures the upper clamp plate 432 with respect to the lower clamp plate 430.

Also illustrated in FIG. 13 is the means associated with pivotably connecting the second jaw stem 424 to the second sidewall engaging leg 420. Jaw stem positioning holes 438 are now located in the sidewall engaging legs (417 and 420) rather than the header 402. Pivot pins 440 pass through the jaw stem positioning holes 438 and engage jaw stem passages 442 which are oversized with respect to the pivot pins 440. Equivalent structure is also true of the first sidewall engaging leg 417.

While the present invention has been described in terms of preferred embodiments, it should be understood that substitutions and changes may be made by one skilled in the art without departing from the spirit of the invention.

What I claim is:

1. A tire bead breaking tool for disengaging a tire bead from a rim of a wheel, the tire bead breaking tool comprising:

a header;

a first sidewall engaging leg having a first leg proximal end attaching to said header and a first leg distal end extending beyond said header;

a second sidewall engaging leg spaced apart from said first sidewall engaging leg by a leg separation S, said second sidewall engaging leg having a second leg proximal end attaching to said header and a second leg distal end extending beyond said header;

a first rim engaging jaw having a first jaw stem which is directly connected to and pivotably engaged with said first sidewall engaging leg;

a second rim engaging jaw having a second jaw stem which is directly connected to and pivotably engaged with said second sidewall engaging leg, said second rim engaging jaw being spaced apart by a jaw separation distance D from said first rim engaging jaw, said first rim engaging jaw and second rim engaging jaw being positioned between said first sidewall engaging leg and said second sidewall engaging leg; and means for advancing said first rim engaging jaw and said second rim engaging jaw toward each other.

2. The tire bead breaking tool of claim 1 further comprising means for adjusting said leg separation S.

3. The tire bead breaking tool of claim 2 wherein at least one of said sidewall engaging legs slidably engages said header and further comprises means for clamping said at least one slidably engaged sidewall engaging leg.

4. The tire bead breaking tool of claim 2 wherein said header has a header passage therethrough, said first sidewall engaging leg and said second sidewall engaging leg slidably engaging said header passage and means for clamping said first sidewall engaging leg and said second sidewall engaging leg to said header.

5. The tire bead breaking tool of claim 4 wherein said means for clamping further comprises:

lower clamp plates attached to said sidewall engaging legs;

tie-down bolts attached to said sidewall engaging legs;

upper clamp plates spaced apart from said lower clamp plates and through which said tie-down bolts pass; and tie-down nuts engaging said tie-down bolts and securing said upper clamp plates.

6. The tire bead breaking tool of claim 2 wherein at least one of said sidewall engaging legs is slidably positionable along said header and further comprising:

leg holes;

multiple sets of leg positioning holes at set intervals along said header, each of said multiple sets of leg positioning holes matching said leg holes; and leg pins for selectively engaging one of said multiple sets of leg positioning holes with said leg holes.

7. The tire bead breaking tool of claim 2 wherein said header has a header passage and at least one of said sidewall engaging legs is slidably positionable along said header passage, and further comprising:

leg holes;

multiple sets of leg positioning holes at set intervals along said header, each of said multiple sets of leg positioning holes matching said leg holes; and leg pins for selectively engaging one of said multiple sets of leg positioning holes with said leg holes.

8. The tire bead breaking tool of claim 2 wherein said means for advancing said first rim engaging jaw and said second rim engaging jaw toward each other further comprise:

jaw advancing bolts engaged in said sidewall engaging legs to abut said jaw stems.

9. The tire bead breaking tool of claim 8 wherein the included angle between said rim engaging jaws and said jaw stems is between about 100° and 105°.

10. The tire bead breaking tool of claim 2 further comprising:

jaw stem passages;

jaw stem positioning holes; and pivot pins,
    wherein said jaw stem passages are oversized in relation to said pivot pins.

11. A tire bead breaking tool for disengaging a tire bead from a rim of a wheel, the tire bead breaking tool comprising:

a header;

a first sidewall engaging leg having a first leg proximal end attaching to said header and a first leg distal end extending beyond said header;

a second sidewall engaging leg spaced apart from said first sidewall engaging leg by a leg separation S, said second sidewall engaging leg having a second leg proximal end attaching to said header and a second leg distal end extending beyond said header;

a first rim engaging jaw having a first jaw stem which is pivotably attached to said header;

a second rim engaging jaw having a second jaw stem which is pivotably attached to said header, said second rim engaging jaw being spaced apart by a jaw separation distance D from said first rim engaging jaw, said first rim engaging jaw and second rim engaging jaw being positioned between said first sidewall engaging leg and said second sidewall engaging leg; and means for advancing said first rim engaging jaw and said second rim engaging jaw toward each other.

12. The tire bead breaking tool of claim 11 further comprising means for adjusting said leg separation S and means for adjusting said jaw separation D.

13. The tire bead breaking tool of claim 12 wherein at least one of said sidewall engaging legs slidably engages said header and further comprises means for clamping said at least one slidably engaged sidewall engaging leg.

14. The tire bead breaking tool of claim 12 wherein said header has a header passage therethrough, said first sidewall engaging leg and said second sidewall engaging leg slidably engaging said header passage and means for clamping said first sidewall engaging leg and said second sidewall engaging leg to said header.

15. The tire bead breaking tool of claim 12 wherein at least one of said sidewall engaging legs is slidably positionable along said header and further comprising:

leg holes;

multiple sets of leg positioning holes at set intervals along said header, each of said multiple sets of leg positioning holes matching said leg holes; and leg pins for selectively engaging one of said multiple sets of leg positioning holes with said leg holes; and wherein said means for adjusting said jaw separation D further comprises:

jaw stem passages;

a series of jaw stem positioning holes; and pivot pins which pass through said jaw stem positioning holes and said jaw stem passages.

16. The tire bead breaking tool of claim 15 wherein said jaw stem passages are oversized in relation to said pivot pins.

17. The tire bead breaking tool of claim 12 wherein said header has a header passage and at least one of said sidewall engaging legs is slidably positionable along said header passage, and further comprising:

leg holes;

multiple sets of leg positioning holes at set intervals along said header, each of said multiple sets of leg positioning holes matching said leg holes; and leg pins for selectively engaging one of said multiple sets of leg positioning holes with said leg holes;

wherein said means for adjusting said jaw separation D further comprises:

jaw stem passages;

a series of jaw stem positioning holes; and pivot pins which pass through said jaw stem positioning holes and said jaw stem passages.

18. The tire bead breaking tool of claim 12 wherein said means for advancing said first rim engaging jaw and said second rim engaging jaw toward each other further comprises:

jaw advancing bolts engaged in said sidewall engaging legs to abut said jaw stems.

19. The tire bead breaking tool of claim 18 wherein the included angle between said rim engaging jaws and said jaw stems is between about 100° and 105°.

* * * * *